United States Patent [19]

Markiewitz et al.

[11] 4,095,019
[45] June 13, 1978

[54] FREE RADICAL POLYMERIZATION PROCESS UTILIZING NOVEL INITIATORS

[75] Inventors: Kenneth H. Markiewitz; Alfred J. Restaino, both of Wilmington, Del.

[73] Assignee: ICI Americas Inc., Wilmington, Del.

[21] Appl. No.: 673,539

[22] Filed: Apr. 5, 1976

[51] Int. Cl.² .................. C08F 4/00; C08F 20/70; C08F 26/00; C08F 116/00

[52] U.S. Cl. .................. 526/215; 260/63 K; 260/67 UA; 260/79.3 M; 526/209; 526/211; 526/249; 526/250; 526/270; 526/279; 526/303; 526/312; 526/317; 526/319; 526/320; 526/321; 526/328; 526/335; 526/341; 526/343; 526/346

[58] Field of Search ............ 526/317, 312, 335, 346, 526/328, 341, 319, 343, 250, 209, 303, 211, 321, 215, 249, 270, 279, 326; 260/67 UA, 63 K, 79.3 M

[56] References Cited

U.S. PATENT DOCUMENTS 3,479,185  11/1969  Chambers .................. 96/84

FOREIGN PATENT DOCUMENTS 1,196,626  7/1970  United Kingdom.

OTHER PUBLICATIONS

Jour. Org. Chem., vol. 36, No. 20, pp. 3051–3053, (1971).
Chem. Abs., vol. 62, col. 5331–5332, (1965).

Primary Examiner—Herbert J. Lilling
Attorney, Agent, or Firm—H. Jolyon Lammers

[57] ABSTRACT

Ethylenically unsaturated monomers susceptible to free radical polymerization may be polymerized by contacting the monomers with an initiating compound having the formula:

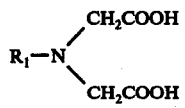

wherein $R_1$ is a substituted or unsubstituted aryl radical.

27 Claims, No Drawings

FREE RADICAL POLYMERIZATION PROCESS UTILIZING NOVEL INITIATORS

FIELD OF THE INVENTION

This invention concerns the polymerization of ethylenically unsaturated polymerizable monomers susceptible to free radical polmerization. Specifically the invention concerns novel methods for initiating polymerization of such monomers and monomer systems containing inactive initiators which initiators may be activated to polymerize the system.

DESCRIPTION OF THE PRIOR ART

Polymerization of ethylenically unsaturated monomers may be initiated by several methods well known to the art. Some of these include the use of high energy electromagnetic radiation such as gamma radiation and x-rays, ultraviolet light radiation, chemical initiators, and thermal means. Many polymerization reactions depend upon the formation of free radicals to cause the initiation of the polymerization. The use of free radical producing agents containing an acetic acid group has been disclosed in Chambers' U.S. Pat. No. 3,479,185. The Chambers patent discloses for example the use of a system of N-phenyl glycine or N,N,N',N',-ethylenediamino tetraacetic acid in combination with a 2,4,5-triphenylimidazolyl dimer as a photo polymerization catalysts.

It has now been discovered however that certain N-substituted aromatic imino diacetic compounds produce free radicals and provide for excellent and versatile initiators without the additional presence of a dimer.

An additional advantage of the initiators of the present invention is their versatility in that they can cause polymerization in presence or absence of air, oxygen, heat, visible or ultraviolet light. While such sources of radiation energies are therefore not required, the presence of them as promoters will tend to increase the activity of the initiator and consequently the rate of polymerization.

SUMMARY OF THE INVENTION

According to the invention there is therefore provided a method of polymerizing a monomer system containing one or more ethylenically unsaturated compounds susceptible to free radical polymerization which comprises initiating polymerization by contacting the system with an effective amount of a dissolved initiator of the formula:

$$R_1-N-(CH_2COOH)_2$$

where $R_1$ is a substituted or unsubstituted aryl radical provided that the ethylenically unsaturated compounds do not contain "any group with which all the acid groups of the initiator will preferentially react chemically" (as hereinafter defined). According to the invention there is also provided a monomer system susceptible to free radical polymerization which comprises one or more ethylenically unsaturated monomers and an initiator comprising a dissolved compound of the formula $R_1-N-(CH_2COOH)_2$ wherein $R_1$ is a substituted or unsubstituted aryl radical or a salt of said compound which salt upon acidification will yield said compound, provided that the ethylenically unsaturated monomers do not contain any group with which the acid group of the compound will preferentially react chemically. By aryl is meant a monovalent radical containing an aromatic ring wherein the free valence is on a carbon atom of the aromatic ring.

DESCRIPTION OF THE INVENTION

An important limitation of the process of the invention requires that the initiator must be soluble in at least one phase of a polymerizable system. This polymerizable system may be an emulsion, suspension or solution polymerizable system. Often the initiator is soluble in the polymerizable monomer or monomers and no additional solvent is required. Alternatively in a polymerizable system, where the initiator is not directly soluble in the monomer, the system must comprise a solvent such as for example, water or methanol for the initiator. The term "dissolved initiator" is therefore meant to include initiators dissolved in the polymerizable monomer and initiators dissolved in a solvent. By the term "system" is meant a composition of matter.

The initiating compounds which are useful in the process of the invention include:

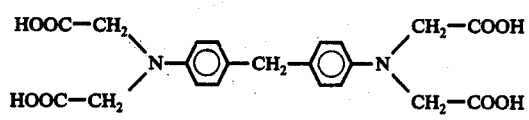

p-methylenedianiline tetraacetic acid

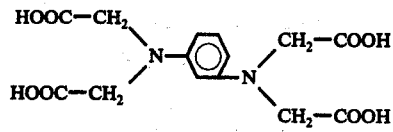

m-phenylenediamine tetraacetic acid

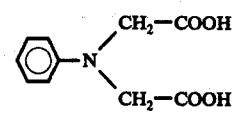

anilinediacetic acid

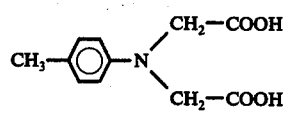

p-toluidinediacetic acid

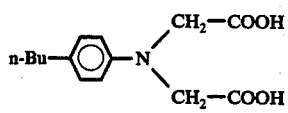

p-(n-butyl)anilinediacetic acid

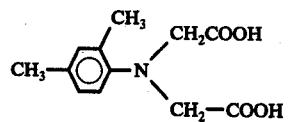

2,4-dimethylanilinediacetic acid

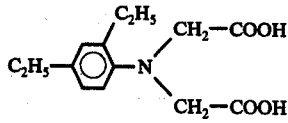

2,4-diethylanilinediacetic acid

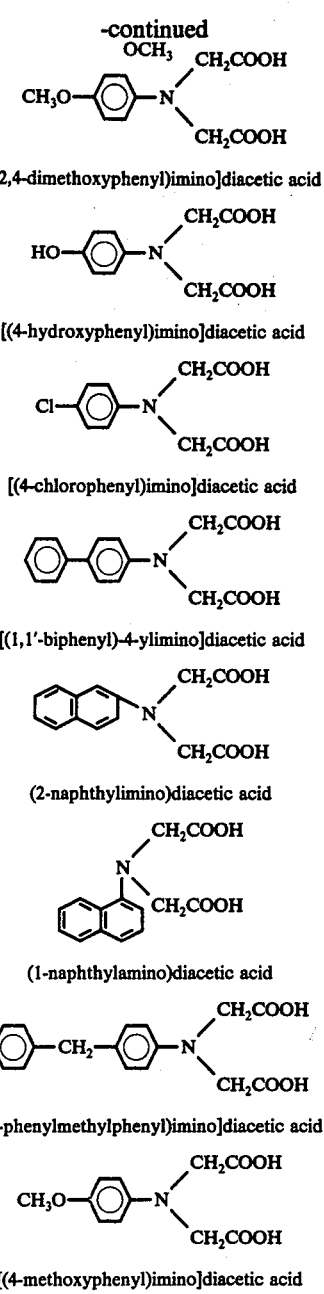

[(2,4-dimethoxyphenyl)imino]diacetic acid

[(4-hydroxyphenyl)imino]diacetic acid

[(4-chlorophenyl)imino]diacetic acid

[(1,1'-biphenyl)-4-ylimino]diacetic acid (2-naphthylimino)diacetic acid (1-naphthylamino)diacetic acid

[(4-phenylmethylphenyl)imino]diacetic acid

[(4-methoxyphenyl)imino]diacetic acid

Preferred initiating compounds are those wherein $R_1$ has the following formula:

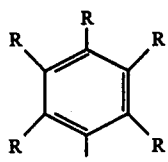

where R is hydrogen, alkyl, alkoxy, phenyl, aralkyl, or alkaryl.

Preferred initiators showing high activity are those containing alkyl or alkoxy substituted aromatic ring group. Other preferred initiators also having high activity are those containing two aromatic rings.

The initiators useful in the process of the invention may be prepared by reacting in an aqueous solution the corresponding amine component with a slight excess of sodium chloroacetate at elevated temperatures. During the reaction, which is usually complete in 2 hours at reflux, the pH of the reaction mixture is carefully controlled at about 7 by the addition of sodium hydroxide. After the reaction is completed the product may usually be obtained as the inactive sodium salt by stripping or alternatively as an active precipitate by acidification such as with hydrochloric acid. In instances where precipitation will not occur after acidification, extraction procedures may be employed to obtain the product.

Monomer

The unsaturated materials which may be polymerized by the practice of this invention are ethylenically unsaturated compounds susceptible to free radical polymerization. These compounds include esters, nitriles and organic halogen compounds which are ethylenically unsaturated compounds of both aromatic and aliphatic types. By way of illustration, vinyl esters such as vinyl acetate, vinyl propionate, vinyl butyrate, vinyl isobutyrate, and other vinyl esters containing as many as 18 or more carbon atoms in the acid moiety, may be polymerized in accordance herewith.

Other vinyl derivatives such as vinyl chloride, vinyl fluoride, chlorotrifluoroethylene, tetrafluoroethylene, butadiene, nitroethylene, methyl vinyl ketone, methyl isopropenyl ketone, butyl vinyl sulfone, vinyl triethoxy silane, ethyl vinyl sulfoxide, styrene, nuclear substituted styrenes including o-methyl, m-methyl, p-methyl styrene, divinylbenzene, and other related compounds may also be polymerized in accordance herewith. Vinylidine derivatives, viz., vinylidene chloride, and vinylidene carbonate respond to this polymerization also.

The acrylates respond particularly well to the techniques disclosed herein and the invention extends to include acrylates and methacrylates containing up to 18 or more carbon atoms such as ethyl acrylate, propyl acrylate, butyl acrylate, isobutyl acrylate, cyclohexo acrylate, cyclohexo methacrylate, decyl acrylate, dodecyl methacrylate, methyl methacrylate, benzyl-acrylate, tetrahydrofurfuryl acrylate, 2-methoxyethyl acrylate, methyl chloroacrylate, pentaerythritol triacrylate, neo-pentylglycol diacrylate, ethyleneglycol acrylate phthalate, 2-hydroxypropyl methacrylate, 2-hydroxyethyl acrylate and other related compounds such as acrylamide, acrylic acid, methacrylic acid respond to treatment set forth herein.

Other materials susceptible to the practice hereof include: acrylonitrile, methacrylonitrile, 2-chloroacrylonitrile, and allyl esters, such as the bisallyl biscarbonate ester of diethylene glycol.

Copolymers of the aforementioned unsaturated materials may be obtained. Among the copolymers which may be prepared in accordance herewith are: copolymers of butadiene, acrylonitrile, vinyl acetate, vinylidene chloride, methyl acrylate, and divinylbenzene with styrene, and one another. Copolymers of butadiene with styrene, butadiene with acrylonitrile, acrylic acid with acrylamide, vinyl acetate with vinylidene chloride, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, styrene mixtures and other mixtures wherein vinyl acetate, or methyl methacrylate may be components of the terpolymers.

Preferred monomer systems of the present invention are those containing water soluble monomers such as acrylamide, diacetone acrylamide, acrylic acid, methacrylic acid; monomers such as diethylaminoethyl methacrylate, dimethylaminoethyl methacrylate or dimethylaminoethyl acrylate and their derivations such as for example amine and quaternary ammonium compounds; vinyl monomer systems containing unsaturated maleate and fumarate polyesters; monomers containing acrylate or methacrylate unsaturation either separately or in combination with comonomers such as styrene, methyl methacrylate, acrylonitrile, vinyl acetate or vinylidene chloride; and latex forming systems containing butadiene either alone or in combination with copolymerizable vinyl monomers such as styrene, acrylonitrile, vinyl acetate or vinylidene chloride.

The initiators of the invention have different effectiveness in different polymerization media, which may be aqueous or organic in nature. Most of the initiators are soluble in organic media. However, in aqueous media the selection of the best initiator is best determined experimentally. In general the least substituted aromatic diacetic acid initiator is water soluble. As groups are substituted on the molecules, initiators may lose water solubility. For example, p-toluidene diacetic acid was found soluble in aqueous solutions whereas p-(n-octyl) anilinediacetic acid was not found soluble in aqueous media.

The ethylenically unsaturated monomers which are polmerizable according to the method of the invention should not contain any group with which all the acid groups of the initiator will preferentially react chemically. For example, monomer substituents such as for example, amines, isocyanate or vinyl epoxy groups are highly reactive with the acid groups of the initiator. Such substituents, if present, will derivatise the acid groups to amides or esters. While amine substituents may cause derivation reactions which may be reversible by acidification, substitutents such as isocyanate or vinyl epoxy groups, will cause irreversible reactions which will permanently diminish or terminate the ability of the initiators to generate free radicals. By the phrase "any group with which all the acid groups of the initiator will preferentially react chemically" is therefore meant any highly reactive groups which will non-reversibly derivatise all the acid groups of the initiator.

As is well known to those skilled in the art, free radical polymerization refers to those polymerization reactions which take place through intermediates having an odd number of electrons and, consequently, an unpaired electron. It is these intermediates which are generally referred to as free radicals. The free radicals are normally generated in one or more of a variety of ways such as by the decomposition of a chemical initiator added to the polymerizable mixture or by the application of heat or ionizing radiation to the composition. If the free radical is generated in the presence of an ethylenically unsaturated monomer described above, the radical will add to the double bond with the regeneration of another radical. This radical will, in turn, react with another monomer and in the course of the reaction generate another free radical resulting in growth of the polymer chain through the addition of one chain to another. Free radical polymerization is described in detail in, for example, the *Encyclopedia of Polymer Science and Technology*, Vol. 7, pages 361–431, Interscience Publishers, 1967, and in the *Textbook of Polymer Science*, Billmeyer, Interscience Publishers, 1962, pages 262–290.

In addition to growth of the polymer chain, several side reactions can also take place during the course of the polymerization reaction. One of these, identified as chain transfer refers to the transfer of an atom from a molecule to a free radical in the reaction mixture. Depending upon the nature of the other material, this can result in the formation of additional polymer molecules, the formation of branch chain polymers, or in termination of the polymerization reaction on a growing radical chain.

Chain transfer agents do not terminate the polymerization reaction entirely but merely terminate a growing chain and allow the polymerization to start elsewhere. If premature termination of the growing polymer chain occurs, a reduced molecular weight results and other polymer properties are achieved. It is, for this reason, often desirable to include in a free radical polymerization system a chain transfer agent which would function in this manner allowing molecular weight control.

The concentration of the various components utilized in the production of polymer in accordance with the invention may be varied over extremely wide ranges and appears to be not narrowly critical. The concentration of the initiator is dependent on the activity of the initiator used; the type and concentration of other components such as solvent and monomer; and promoters such as heat and light. Although a concentration range of 0.01% to 2% is economically preferred for optimum monomer conversion, under favorable conditions shown hereafter in the examples, any amounts which are effective may be used, e.g. initiator concentration of as low as 0.006% by weight of monomer system and as high as 9% or more by weight of monomer system may be used successfully. For example in nonaqueous systems the activity of p-toluidine diacetic acid is far greater than an initiator having an unsubstituted aromatic ring such as aniline diacetic acid. Hence the concentration of a greatly active initiator may be less than those of less active initiators. In general in the presence of air, oxygen or other polymerization inhibitor larger amounts of initiator may be required.

The temperatures used in the practice hereof may vary widely and are only limited by the freezing and boiling point of the polymerizable system. In aqueous systems the polymerization may be conducted between about 0° and 100° C. Nonaqueous media such as styrene, or isopropyl methacrylate may allow for polymerization temperatures as high as about 125° C. Other nonaqueous media may allow for polymerization temperature of 200° C or higher.

The invention does not exclude the utilization of polymerization inhibitors, accelerators and molecular weight modifiers. Any of these may be employed if so desired. Inhibitors may include any free radical scavenger.

The polymerization process according to the invention may occur over a wide range of pH. The optimum pH of the polymerizable system will be affected by the stability of the monomer and the solubility and stability of the initiator.

It has also been discovered that the initiators are considerably less active when not substantially in the acid form. The activity of the initiator and thus the rate of polymerization may therefore be regulated by adjustment of pH. As a further advantage, the invention therefore provides for a latent polymerizable syystem by having the initiators present not in the acid form but as the inactive salt, for example, the inactive sodium salt, or amine salt. Such a latent system may then be activated by the simple adjustment of pH to a point below the neutralization point of the system. The neutralization point is hereby defined as the pH point of the polymerizable system at which the initiator becomes active due to the presence of acid group. In general the lower the pH of the polymerizable system, the more active the initiator and conversely the higher the pH, the slower the rate of polymerization will be. It should be noted that the neutralization point of the polymerizable system will vary depending on the specific initiator employed.

A particular advantage of a latent polymerizable system is the ability to polymerize a liquid polyymerizable system at any time in situ merely by the addition of acid to lower the pH of the system. For example, in oil recovery operation a water soluble monomer mixture of sodium acrylate and acrylamide and an inactive salt of an initiator may be introduced into an oil bearing formation as a low viscosity liquid and subsequently polymerized by the addition of acid to activate the initiator to produce a highly viscous polymer solution in situ.

The invention also provides for a polymerizable system containing additionally a second free radical polymerization initiator or catalyst such as a peroxide system to cause postcuring.

The invention is further illustrated by the following examples in which all parts and percentages are by weight unless otherwise specified. In the case of the water soluble polymers, the symbol "Ni" represents intrinsic viscosity (i.v.) as measured in dl/g in a 2N sodium chloride solution at 25.5° C.

EXAMPLE 1

A solution of 25 grams of glacial acrylic acid, 75 grams of acrylamide and 100 grams distilled water was prepared. To this monomer solution was added a solution of catalyst consisting of 0.2 gram p-toluidene diacetic acid and 2.5 grams NaOH, and 87.5 grams distilled water. This mixture resulted in a very light tan colored clear solution. The pH was 4.4, the monomer concentration was 20.0% and the catalyst concentration was 0.20%.

The monomer solution was then poured into a polyethylene bag, flushed with nitrogen for 1 minute then sealed with tape. The sample was placed in a dark cabinet for 17 hours at room temperature. A rubber gel had resulted. Isolation of copolymer with a methanol-sodium hydroxide solution showed the conversion of monomers to copolymer to be essentially 100% complete. The intrinsic viscosity of the copolymer was 16.6 gl/gm when measured in 2 N NaCl at 24° C.

To illustrate the wide range of concentrations in which the initiators are useful in free radical polymerizations, p-toluidine diacetic acid was used to initiate a 20% aqueous acrylamide solution in the presence of air and sunlight at room temperature. The following Table I shows the results.

TABLE 1

| Example | Initiator Concentration % | Ni i.v. | % Monomer Conversion |
|---|---|---|---|
| 2 | 4 | 1.6 dl/g | 99 |
| 3 | 2 | 2.8 dl/g | 100 |
| 4 | 1 | 3.8 dl/g | 100 |
| 5 | 0.5 | 5.8 dl/g | 100 |
| 6 | 0.16 | 9.0 dl/g | 100 |

TABLE 1-continued

| Example | Initiator Concentration % | Ni i.v. | % Monomer Conversion |
|---|---|---|---|
| 7 | 0.04 | — | little reaction |

The results of Examples 2 to 7 also indicate that the intrinsic viscosity of the polymer is inversely proportional to the concentration of the catalyst.

Different initiators were evaluated for their activity by polymerizing 2 g of acrylamide dissolved in 8 ml of distilled water. The following Table II indicates the results. Where the indicated light source is sunlight, the samples were exposed to direct sunlight in an open jar at 28° C. Where the indicated source is laboratory daylight the samples were stored in a closed jar near a window under ambient conditions.

TABLE II

| Example | Initiator | Concentration | Light Source | Exposure Light |
|---|---|---|---|---|
| 8 | aniline-diacetic acid | 2% | sunlight | 9 minutes |
| 9 | toluidine-diacetic acid | 2% | sunlight | 45 seconds |
| 10 | p-phenylene diaminetetraacetic acid | 0.5% | sunlight | 20 minutes |
| 11 | 2,4-dimethyl-anilinediacetic acid | 1.0% | lab. daylight | 14 hours |
| 12 | 2,4-dimethoxy-anilinediacetic acid | 1.0% | lab. daylight | 1 hour |

All of the examples 8–12 produced polymer in the indicated time period.

EXAMPLE 13

To a solution of 2g acrylamide and 40 mg p-toluidine diacetic acid in 8g water were added 2 drops of a 33% sodium hydroxide solution. The resulting pH was 9. The solution was exposed to sunlight for 80 minutes but failed to gel. Thereupon, pH was adjusted to 4.5 by addition of concentrated hydrochloric acid and exposure continued. Gelation was complete within 6 minutes. Conversion: 97.5%. The intrinsic viscosity of the polyacrylamide was Ni = 4.6 dl/g in 2N NaCl at 25.5° C.

EXAMPLE 14

To a solution of 2g acrylamide and 8g water were added 20 mg of the sodium salt of p-toluidine diacetic acid. Upon illumination with a 300 watt visible light source at 12 inches for 1¾ hours, no gelation occurred. Thereupon, 20 mg of p-toluene sulfonic acid were added. The resulting pH was 3. A clear, colorless gel formed after 9 minutes of additional exposure indicating the acrylamide had polymerized.

EXAMPLE 15

To a solution of 2g acrylamide and 8g water were added 20 mg of the sodium salt of p-toluidine diacetic acid. Upon heating at 60° C in the dark for over 4 hours, no polymerization occurred. Thereupon, 20 mg of p-toluene sulfonic acid were added. The resulting pH was 3. Heating at 60° C in the dark was continued. A clear, colorless gel formed in 15 minutes.

EXAMPLE 16

To a solution of 2g acrylamide in 4g water and 4g methanol were added 40 mg of the sodium salf of p-n-butylaniline diacetic acid. The sample was illuminated for 1½ hours with a 300 watt visible light source at a distance of 12 inches. No polymerization occurred. Thereupon, 40 mg p-toluene sulfonic acid were added. The resulting pH was 3. Further illumination for 4 minutes resulted in a cloudy, white gel containing polyacrylamide.

EXAMPLE 17

To 2g of a polyoxypropylene bisphenol A fumarate resin (commercially available from ICI-US Inc. as ATLAC 282-05 unsaturated polyester resin) was added 0.3 ml of a solution of dimethylaminoethylmethacrylate containing 10 mg of p-n-butylaniline diacetic acid. The acid is presumably present as the amine salt. The sample was illuminated for 1¼ hours with a 300 watt visible light source at a distance of 12 inches. A very slight amount of polymerization occurred. After addition of 300 mg p-toluene sulfonic acid and further illumination, a hard cure occurred within 4 minutes.

EXAMPLE 18

To 2g of polyoxypropylene bisphenol A fumarate resin was added 0.3 ml of a solution of dimethylaminoethylacrylate containing 10 mg of p-n-butylaniline diacetic acid. The sample was heated at 60° overnight in the dark. No cure occurred. After addition of 200 mg p-toluene sulfonic acid, the sample cured overnight to a hard solid.

EXAMPLE 19

To 1g polyoxypropylene bisphenol A furmarate resin was added 50 mg of dimethyl-p-toluidine diacetate. The sample was illuminated for 1 hour using a 300 watt visible light source at a distance of 12 inches. No cure occurred. Thereupon, 50 mg p-toluene sulfonic acid were added, illumination continued, and complete cure occurred within 6 minutes.

EXAMPLE 20

Preparation of m-phenylenediamine tetraacetic acid

Into a three-neck, round botton (r.b) flask, equipped with glass stirrer, reflux condenser, thermometer, and addition funnel were placed 32.4g (0.3M) m-phenylenediamine dissolved in 300 ml water and 203.1g sodium chloroacetate in 300 ml water, and 10 drops of a mixed acid/base indicator. The solution was heated to reflux and a solution of 48g sodium hydroxide in 150 ml water added dropwise so as to maintain the pH between 5 and 8. Reaction was completed within 65 minutes. The reaction mixture was cooled and acidified to pH 1 with 120 ml conc. hydrochloric acid. The formed precipitate was filtered, washed with water at pH = 1, and vacuum dried below 40° C. Recovered 49.4g gray solids (mp = 188° C, %N = 7.6).

EXAMPLE 21

Preparation of p-(n-butyl)aniline diacetic acid

Into a three-neck r.b. flask, equipped with glass stirrer, reflux condenser, thermometer, and addition funnel were placed 29.9g (0.2M) p-n-butylaniline; 46.6g (0.4M) sodium chloroacetate dissolved in a solution of 200 ml water and 45 ml dioxane and 10 drops of a mixed acid/base indicator. The solution was heated to reflux and a solution of 16g sodium hydroxide in 64 ml water was added dropwise so as to maintain the pH between 5 and 8 as shown by the indicator. Reaction was completed within 4 hours. The reaction mixture upon dilution with 500 ml water and cooling was acidified with 43 ml conc. hydrochloric acid. The formed precipitate was filtered and washed twice with 200 ml of water at pH 1.3 and dried under vacuum at 40° C. Yield: 41.2g beige solids (%N = 4.9.)

EXAMPLE 22

Preparation of dimethyl-p-toluidinediacetate

Into a three-neck r.b. flask, fitted with stirring assembly, thermometer, reflux condenser, and a dropping funnel were placed 10.7g (0.1M) p-toluidine, 21.7g (0.2M) methylchloroacetate, 50 ml water, and 80 ml dioxane. The solution was heated to reflux and 32g of an aqueous solution containing 8g (0.2M) sodium hydroxide was added dropwise so as to maintain the charge at a neutral pH. Addition was completed within 1½ hours. The flask was cooled to 5° C, and the product was poured into a 4 l. beaker. Upon addition of 3 l. of water, a ppt. formed which was discarded. Extraction of the aqueous phase with chloroform and stripping the extract gave 24.6g of light-yellow solid.

EXAMPLE 23

Preparation of p-methylenedianilinetetraacetic acid

Into a three-neck r.b. flask, equipped with glass stirrer, reflux condenser, thermometer, and addition funnel were placed 29.7g p-methylenedianiline (0.15M), and 87.3g sodium chloroacetate (0.75M) dissolved in 300 ml distilled water and 10 drops of a mixed acid/base indicator. The solution was heated to reflux and 150 ml of an aqueous solution containing 48g (1.2M) sodium hydroxide added dropwise at a rate so as to maintain the pH at 6. Reaction was complete within 2½ hours. The reaction mixture was poured into a 4 l. beaker filled with ice water. To this solution were added slowly and with constant very rapid stirring 60 ml concentrated hydrochloric acid solution. Finally, the pH was brought to 1.5 with 1N hydrochloric acid solution. A precipitate formed. The precipitate was filtered and washed twice with 3½ l. and 1½ l. of cold water whose pH was adjusted to 2. The precipitate was filtered and dried under vacuum, taking care not to heat the precipitate above 35° C. A white powder weighing 62g was obtained. The product had to be refrigerated in order to reduce its rate of decomposition. (%N = 6.04, % Cl = 0.15, % water = 9.4, % sulfated ash = 0.20). If the product was kept refrigerated in the dark and remained stable for more than one month.

EXAMPLE 24

Preparation of p-toluidine diacetic acid

Into a three-neck, r.b. flask, equipped with glass stirrer, reflux condenser, thermometer, and addition funnel were placed 53.5g p-toluidine (0.5 M), and 116.5g sodium chloroacetate dissolved in a solution of 200 ml water and 10 drops of a mixed acid/base indicator. The solution was heated to reflux and a solution of 40g sodium hydroxide in 120 ml water added dropwise so as to maintain the pH between 5 and 8. Reaction was complete within 80 minutes. The reaction mixture upon cooling was acidified with 15 ml of conc. hydrochloric acid solution. The formed precipitate was filtered, washed with water at pH 2, and vacuum dried below 40° C. Yield: 86g beige solids. (%N = 6.0.)

EXAMPLE 25

Preparation of the sodium salt of p-(n-butyl)aniline diacetic acid

Into a three-neck r.b. flask, equipped with glass stirrer, reflux condenser, thermometer and addition funnel were placed 29.9g (0.2 M) p-n-butylaniline; 46.6g (0.4 M) sodium chloroacetate dissolved in a solution of 200 ml water and 45 ml dioxane and 10 drops of a mixed acid/base indicator. The solution was heated to reflux and a solution of 16g sodium hydroxide in 64 ml water was added dropwise so as to maintain the pH between 5 and 8 as shown by the indicator. Reaction was completed within 4 hours. The reaction mixture was stripped to dryness to give 50g of the sodium salt of p-(n-butyl)aniline diacetic acid. Some sodium chloride impurity may be present in the product.

EXAMPLE 26

To a solution containing 2 grams of acrylamide, 2.0 grams of sodium chloride, 40 mg p-toluidine diacetic acid were added 2 drops of a 33% sodium hydroxide solution. The resulting pH was 9. The solution was exposed to sunlight for 80 minutes but failed to gel. Thereupon, pH was adjusted to 4.5 by addition of concentrated hydrochloric acid and exposure continued. Gelation was complete within 6 minutes. Conversion was 97.5%. The molecular weight was higher than that of a control sample, with no salt added, as evidenced by its solution viscosity.

EXAMPLE 27

To a solution of 2 g acrylamide in 7.95 g of water were added 0.05 cc of a solution containing 250 mg of p-toluidine diacetic acid in 100 ml of water. The catalyst concentration based on monomer weight was 0.006%. The sample was degassed in a vial and kept under vacuum. After illumination with a 300 watt visible light source at 12 inches for 25 minutes gelation was observed. A control sample similarly exposed did not gel. Conversion 60%. The intrinsic viscosity of the polyacrylamide was $N_i = 19.4$ dl/g in 2N NaCl at 25.5° C.

What is claimed is:

1. A method of polymerizing a monomer composition containing one or more ethylenically unsaturated compounds susceptible to free radical polymerization which comprises initiating polymerization by contacting the composition with an effective amount of dissolved initiating compound of the formula $R_1-N-(CH_2COOH)_2$ where $R_1$ is substituted or unsubstituted aryl radical, provided that the ethylenically unsaturated compounds do not contain any group with which the acid group of the initiator will preferentially react chemically.

2. A method as claimed in claim 1 wherein $R_1$ is an unsubstituted aryl radical.

3. A method as claimed in claim 1 wherein the compound is anilinediacetic acid.

4. A method as claimed in claim 1 wherein $R_1$ is an alkyl or alkoxy substituted aryl radical.

5. A method as claimed in claim 1 wherein the initiating compound is p-(n-butyl) anilinediacetic acid.

6. A method as claimed in claim 1 wherein the initiating compound is p-toluidinediacetic acid.

7. A method as claimed in claim 1 wherein the initiating compound is 2,4-dimethylanilinediacetic acid.

8. A method as claimed in claim 1 wherein the initiating compound is diimino aryl tetraacetic acid.

9. A method as claimed in claim 8 wherein the initiating compound is m-phenylenediamine tetraacetic acid.

10. A method as claimed in claim 8 wherein the initiating compound is p-methylenedianiline tetraacetic acid.

11. A method as claimed in claim 1 wherein the composition is contacted by a salt of the initiating compound which salt upon acidification will yield said compound and where the composition is subsequently acidified.

12. A method as claimed in claim 11 wherein said acidification is effected by pH adjustment of the composition to within a range of 1-9.

13. A method as claimed in claim 11 wherein the salt is an alkaline metal salt.

14. A method as claimed in claim 11 wherein the salt is an ester.

15. A method as claimed in claim 11 wherein the salt is an amine salt.

16. A method as claimed in claim 11 wherein the ethylenically unsaturated monomers are acrylamide and acrylic acid and wherein the pH is adjusted to a range of 3 to 5.

17. A method as claimed in claim 1 wherein the ethylenically unsaturated compounds are selected from class consisting of acrylic acid, acrylamide, methacrylic acid, diethylaminoethyl methacrylate, dimethylaminoethyl methacrylate, dimethylaminoethyl acrylate, maleate or fumarate polyester, butadiene, styrene, methyl methacrylate, acrylonitrile, vinyl acetate and vinylidene chloride.

18. A monomer composition susceptible to free radical polymerization which comprises one or more ethylenically unsaturated compounds and an initiator comprising a dissolved compound of the formula $R_1-N-(CH_2COOH)_2$ wherein $R_1$ is a substituted or unsubstituted aryl radical or a salt of said compound which salt upon acidification will yield said compound, provided that the ethylenically unsaturated compounds do not contain any group with which the acid group of the compound will preferentially react chemically.

19. A monomer composition as claimed in claim 18 wherein the dissolved compound is aniline diacetic acid.

20. A monomer composition as claimed in claim 18 wherein the dissolved compound is p-(n-butyl)anilinediacetic acid.

21. A monomer composition as claimed in claim 18 wherein the dissolved compound if p-toluidinediacetic acid.

22. A monomer composition as claimed in claim 18 wherein the dissolved compound is 2,4-dimethylanilinediacetic acid.

23. A monomer composition as claimed in claim 18 wherein the dissolved compound is m-phenylenediamine tetraacetic acid.

24. A monomer composition as claimed in claim 18 wherein the dissolved compound is p-methylenedianiline tetraacetic acid.

25. A monomer composition as claimed in claim 18 wherein the salt of the dissolved compound is an alkali metal salt.

26. A monomer composition as claimed in claim 18 wherein the salt of the dissolved compound is an ester.

27. A monomer composition as claimed in claim 18 wherein the ethylenically unsaturated compounds are selected from class consisting of acrylic acid, methacrylic acid, diethylaminoethyl methacrylate, dimethylaminoethyl methacrylate, dimethylaminoethyl acrylate, butadiene, styrene, methyl methacrylate, acrylonitrile, vinyl acetate and vinylidene chloride.

* * * * *

UNITED STATES PATENT AND TRADEMARK OFFICE
CERTIFICATE OF CORRECTION

PATENT NO. : 4,095,019

DATED : June 13, 1978

INVENTOR(S) : Kenneth H. Markiewitz and Alfred J. Restaino

It is certified that error appears in the above-identified patent and that said Letters Patent are hereby corrected as shown below:

Column 7, line 55, "gl/gm" should read --dl/gm--.

Column 9, line 11, "ATLAC 282-95" shouldread --ATLAC 382-05--.

Signed and Sealed this

Twelfth Day of June 1979

[SEAL]

Attest:

RUTH C. MASON
Attesting Officer

DONALD W. BANNER
Commissioner of Patents and Trademarks